United States Patent [19]

Wood et al.

[11] Patent Number: 4,524,941

[45] Date of Patent: Jun. 25, 1985

[54] REARVIEW MIRROR SUPPORT BRACKET

[75] Inventors: Denis Wood, Dublin, Ireland; John F. Thomas, Jr., Holland, Mich.; Barry Dipper, Cardiff, Wales; Philip D. Stegenga; John H. Veltkamp, both of West Olive, Mich.; William L. Katsma, Jenison; Robert L. Norton, Holland, both of Mich.

[73] Assignee: Donnelly Corporation, Holland, Mich.

[21] Appl. No.: 276,839

[22] Filed: Jun. 24, 1981

[51] Int. Cl.³ .................................................. B60R 1/02
[52] U.S. Cl. .................................... 248/544; 248/549; 248/221.3
[58] Field of Search ....................... 248/73, 221.3, 544, 248/548, 549

[56] References Cited

U.S. PATENT DOCUMENTS

| D. 81,345 | 6/1930 | Mariani . |
| D. 84,252 | 5/1931 | Mariani . |
| D. 170,683 | 10/1953 | Fischer . |
| D. 170,684 | 10/1953 | Fischer . |
| D. 178,645 | 9/1956 | Collura . |
| D. 178,646 | 9/1956 | Collura . |
| D. 179,987 | 4/1957 | Stortz . |
| D. 188,370 | 7/1960 | Grove . |
| D. 192,633 | 4/1962 | Stortz . |
| D. 192,728 | 5/1962 | Walker . |
| D. 197,888 | 4/1964 | Jepson et al. . |
| D. 250,332 | 11/1978 | Aiga . |
| 614,503 | 11/1898 | Sackett . |
| 716,713 | 12/1902 | Hughes .................. 248/221.3 X |
| 925,524 | 6/1909 | Steinmetz . |
| 1,252,207 | 1/1918 | Walker . |
| 1,313,113 | 8/1916 | Pleister .................. 248/74 B |
| 1,794,700 | 3/1931 | McCaskey .............. 248/221.3 |

(List continued on next page.)

FOREIGN PATENT DOCUMENTS 1199641 8/1965 Fed. Rep. of Germany .
1275394 8/1968 Fed. Rep. of Germany .
1780550 5/1970 Fed. Rep. of Germany .

(List continued on next page.)

OTHER PUBLICATIONS

George C. Knight Co., brochure entitled "Crusader--Complete View Mirrors", dated Oct. 26, 1949.
U.S. Government, "Motor Vehicle Safety Standard No. 111 for Rearview Mirrors", dated Feb. 26, 1977.
EEC European Motor Vehicle Regulations 0.08.29, 2.04.05, dated Mar. 1, 1971.
Federal Motor Vehicle Safety Standard No. 111, "Laboratory Procedures for: Rearview Mirrors", dated Nov. 29, 1978, U.S. Dept. of Transportation, National Highway Traffic Safety Administration, Enforcement Office of Vehicle Compliance.

Primary Examiner—William H. Schultz
Attorney, Agent, or Firm—Price, Heneveld, Huizenga & Cooper

[57] ABSTRACT

A rearview mirror support bracket is disclosed having a body defining a front surface, a rear surface, a top end and a bottom end. A pair of elongated, spaced, opposed clips are formed on the back surface of the body. The clips define grooves for receipt of a windshield mounted button. The body has an I-beam configuration in cross section and includes a central web and front and rear flanges defining the front and back surfaces. A wall surrounds the opposed clips and defines an open end through which the button may be slid. Resilient tension and support members are defined by the rear flange in the clip area. At least one resilient retainer is defined by the rear flange. The retainer engages the button and retains the bracket on the button after assembly. The front flange adjacent its lower end defines a spherical ball which is adapted to be snap fitted into a correspondingly configured socket included in a mirror case assembly. The clips and bracket are dimensioned so that when a predetermined force impacts the ball, the clips will separate from the button and the bracket will break away from the button support.

2 Claims, 28 Drawing Figures

U.S. PATENT DOCUMENTS

| | | |
|---|---|---|
| 1,929,201 | 10/1933 | Frohlich et al. . |
| 2,088,320 | 7/1937 | De Vries . |
| 2,457,639 | 12/1948 | Brooks . |
| 2,771,263 | 11/1956 | Boho . |
| 2,775,919 | 1/1957 | Fischer . |
| 2,823,004 | 2/1958 | Melloh .................... 248/312.1 X |
| 2,823,479 | 2/1958 | Adanowski . |
| 2,940,361 | 6/1960 | Francisco . |
| 2,968,995 | 1/1961 | Holden . |
| 3,120,369 | 2/1964 | Gray, Jr. . |
| 3,131,251 | 4/1964 | Ryan . |
| 3,427,095 | 2/1969 | Dykema et al. . |
| 3,512,746 | 5/1970 | Vitaloni et al. . |
| 3,513,807 | 5/1970 | Helle . |
| 3,534,938 | 10/1970 | Jordan et al. . |
| 3,544,259 | 12/1970 | Fujita ............................ 248/549 |
| 3,564,984 | 2/1971 | Alexander . |
| 3,589,662 | 6/1971 | Lagrange . |
| 3,601,352 | 8/1971 | Jensen et al. . |
| 3,666,225 | 5/1972 | Weinberger . |
| 3,800,449 | 4/1974 | Minatodani et al. . |
| 3,828,623 | 8/1974 | Zillner . |
| 3,869,017 | 3/1975 | Feustel et al. . |
| 3,918,799 | 11/1975 | Kurz, Jr. et al. . |
| 3,954,252 | 5/1976 | Yoda . |
| 4,012,022 | 3/1977 | Tomita . |
| 4,023,762 | 5/1977 | Batts ............................ 248/340 X |
| 4,254,931 | 3/1981 | Aikens .......................... 248/549 |
| 4,340,199 | 7/1982 | Brock ........................... 248/544 |

FOREIGN PATENT DOCUMENTS

| | | |
|---|---|---|
| 2024118 | 11/1970 | Fed. Rep. of Germany . |
| 2153875 | 5/1973 | Fed. Rep. of Germany . |
| 2357543 | 9/1974 | Fed. Rep. of Germany . |
| 2414075 | 11/1974 | Fed. Rep. of Germany . |
| 2530596 | 1/1977 | Fed. Rep. of Germany . |
| 2539681 | 3/1977 | Fed. Rep. of Germany . |
| 2744708 | 12/1979 | Fed. Rep. of Germany ...... 248/549 |
| 7111507 | 11/1972 | France . |
| 7245225 | 7/1974 | France . |
| 7316857 | 12/1974 | France . |
| 7409477 | 10/1975 | France . |
| 7710637 | 4/1977 | France . |
| 2354219 | 2/1978 | France . |
| 421078 | 12/1934 | United Kingdom . |
| 742838 | 1/1956 | United Kingdom . |
| 768637 | 2/1957 | United Kingdom . |
| 1096178 | 12/1967 | United Kingdom . |

REARVIEW MIRROR SUPPORT BRACKET

CROSS-REFERENCE TO RELATED APPLICATIONS

This application is related to commonly-owned, co-pending applications, Ser. No. 276,969 now U.S. Pat. No. 4,436,371, entitled VEHICLE MIRROR ASSEMBLY, and Ser. No. 276,838, entitled VEHICLE MIRROR AND SUPPORT ASSEMBLY, both of which were filed on even date herewith.

BACKGROUND OF THE INVENTION

The present invention relates to vehicle interior rearview mirror assemblies and more particularly to a mirror assembly supported from a button secured to the interior of a vehicle windshield.

Heretofore, various rearview mirror assemblies have been proposed. In one form, the interior rearview mirror is suspended from a support attached to the vehicle header adjacent the windshield. These forms of mirror mounts are not completely acceptable. Present vehicle windshield areas, angles of inclination and radii of curvature place certain design constraints on such interior rearview mirror configurations. Aesthetically unpleasing and/or relatively long support arms must be used in order to bring a header mounted mirror into the viewing position of the vehicle operator.

As a result, the majority of rearview mirrors are now attached directly to the windshield of the vehicle. An example of one such windshield mounted mirror may be found in U.S. Pat. No. 3,131,251, entitled MIRROR MOUNTING ASSEMBLY and issued on Apr. 28, 1964, to Ryan. As shown therein, a button is secured by a suitable adhesive to an interior surface of the windshield. The button has a coefficient of expansion similar to that of the windshield glass. A mount defines a shaped recess or cutout which has a complementary configuration to the button. Secured to the mount is an arm to which a mirror case is adjustably attached. The mount supports the mirror case from the windshield when it is slid over the windshield button.

Various governmental agencies have imposed certain standards, test procedures, test conditions, records and recording formats on the manufacture of internal rearview mirror assemblies. The current federal safety standard in the United States is applicable to passenger cars, multi-purpose passenger vehicles, trucks and buses. The stated purpose of the standard is to reduce the number of deaths and injuries that occur when the driver of a motor vehicle does not have a clear and reasonably unobstructed view to the rear. It requires that each passenger car have an inside rearview mirror of unit magnification and that the mirror provide a specified view. The mirror mounting is required to provide a stable support for the mirror. Mirror adjustment by tilting in both horizontal and vertical directions must be provided. Further, if the mirror assembly is located in the head impact area, the mounting is required to deflect, collapse or break away without leaving sharp edges when the reflective surface of the mirror is subjected to a force of 90 pounds in any forward direction which is not more than 45° from the forward longitudinal direction of the vehicle.

Proposed future standards may require the avoidance of any column loading possibility if a mirror assembly is impacted. Such standard would prevent any mirror assembly from including a support which would not collapse or move upon impact to prevent injury.

Another example of a regulation which must be considered by the manufacturer is that promulgated by the European Economic Community (EEC). The EEC Motor Vehicle Regulation sets forth certain standards and testing requirements for interior rearview mirror assemblies. In order to pass a bending test of this regulation, it is necessary that the base or mirror support not leave any "dangerous projection" should the rod or support become detached from its vehicle mount point.

Mirror mounts must be sufficiently rigid to withstand normal loads imposed during use. Mounts must maintain proper operating characteristics throughout the full range of temperatures which might be experienced. Also, as should be apparent, the assembly must be adjustable and meet various governmental regulations. The wide variety of windshield surface areas, angles of inclination and radii of curvature encountered must also be considered in designing any mirror assembly which is adaptable to more than one style or brand of vehicle.

Various proposals have been made for detachably mounting the rearview mirror to the button or other portion of the vehicle in a breakaway fashion. An example of one such mirror may be found in U.S. Pat. No. 4,012,022, entitled BREAKAWAY MIRROR MOUNTING and issued on Mar. 15, 1977, to Tomita. This patent discloses a rearview mirror assembly including a base plate and a supporting arm. The base plate is fastened to the vehicle header immediately above the windshield. The supporting arm defines an abutting surface from which a configured projection extends. The projection is received with a corresponding configured opening defined by the base plate. Lateral protrusions on the projection are engaged by resilient strips defined by the base plate.

Another prior windshield-mounted interior rearview mirror including a breakaway feature may be found in French patent publication No. 2,229,233. The rearview mirror disclosed therein includes a mirror case support arm of a rigid material and a base part or button which is attached to the vehicle windshield. A separate resilient clip secures the support arm to the base part. The clip is fabricated from a plastic material and the support arm is firmly secured to the button through the plastic clip. Some of the engaging surfaces of the clip are flexible so that the clip and support arm can be disengaged from the button upon impact to the mirror case. The assembly includes essentially three parts.

A still further example of a breakaway mirror assembly includes a one-piece plastic support bracket and a rigid, substantially inflexible button. The bracket includes a support arm and an attachment means which is integral therewith. The button is formed from stamped or die cast metal and is securely bound directly to the inside surface of the vehicle windshield. The button has a linear coefficient of thermal expansion which is close to that of the glass. Repeated temperature cycling or heating and cooling of the windshield and/or button will not induce strains which would subsequently weaken the adhesive. The button defines a recess bordered by a pair of opposed, inwardly facing grooves. The bracket defines a pair of outwardly extending tongues which are engaged by and slide into the grooves of the base part. The bracket also includes bearing surfaces which are pressed slightly against complementary bearing surfaces of the button. These surfaces assist in securing the attachment of the bracket to the button. The bracket is assembled to the button from a point above the button and immediately below the vehicle header. When the bracket sustains an impact of predetermined magnitude, the lower end of the bracket at its attachment area will in effect pivot about a bottom wall defined by the button. The pliable tongues will release from the grooves of the button.

A need exists for an interior rearview mirror assembly which is capable of satisfying the various design criteria, is configured to be usable in the majority of vehicles which have varying windshield areas, angles of inclination and radii or curvature, which will readily break away from the mirror mount when subjected to an impact of predetermined magnitude, which is aesthetically pleasing and capable of high volume production at reduced manufacturing cost from that heretofore experienced.

SUMMARY OF THE INVENTION

In accordance with the present invention, a unique rearview mirror support bracket is provided whereby the aforementioned needs are substantially fulfilled. Essentially, the bracket is adapted for attaching the rearview mirror to a mounting button which is secured directly to an interior surface of the windshield. The bracket includes a body defining front and rear surfaces. An attachement means is joined to the body adjacent its top end and on its rear surface. The attachment means includes a generally planar surface from which a pair of opposed, elongated, resilient clips extend. The clips define opposed, inwardly opening grooves which are dimensioned to receive the windshield mounting button in a tongue and groove fashion. The attachment means further includes a pivot and tension means which extends from the planar surface and engages the mounting button. The pivot and tension means is dimensioned to tension the clips after receipt of the button. The bracket is securely located on the button and good vibration characteristics are obtained. The pivot and tension means also define a pivot about which the bracket rotates to break away from the button when it sustains a predetermined impact.

In a presently preferred embodiment of the invention, the bracket is molded as an integral one-piece member with the attachment means formed integral therewith. The body has an I-beam configuration in cross section and includes a central web, a front flange and a rear flange. A mirror case mounting means, preferably in the form of a spherical ball, is molded integral with the front flange of the body. A plurality of angularly related ribs may be formed integral with the web between the front and back flanges to further reduce vibration.

Resilient, retaining means for engaging and retaining the bracket on the button after the attachment clips have received the button adjacent the attachment clips may also be included. In one form such retaining means is a resilient, semi-spherical member which engages the button and tensions the clips. In another form, the retaining means is a sloped, detent ridge which engages the button.

The mirror support bracket is adapted for use in an assembly with a mirror case having a rear surface at which a socket is supported. The socket is configured to snap onto the spherical ball defined by the bracket body.

When subjected to an impact of predetermined magnitude, the resilient clips will spread apart and separate from the windshield button. The bracket pivots about the pivot and tension means. The mirror assembly will therefore separate in a breakaway fashion from the button.

DETAILED DESCRIPTION OF THE PREFERRED EMBODIMENTS

Figure 1:
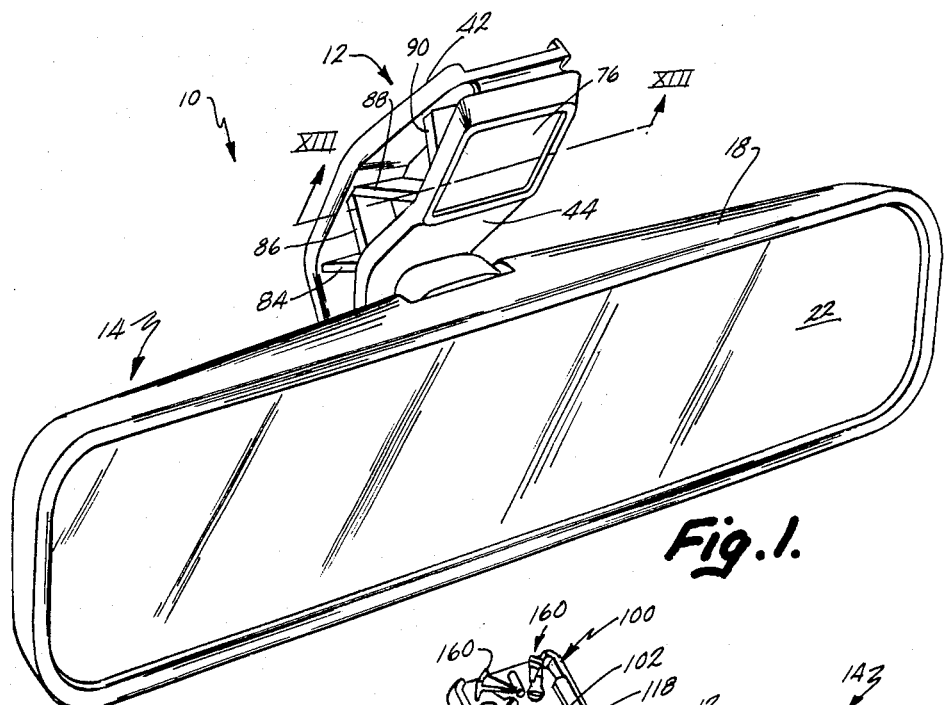
FIG. 1 is a perspective, front elevational view of a bracket and mirror case assembly in accordance with the present invention.
Figure 2:
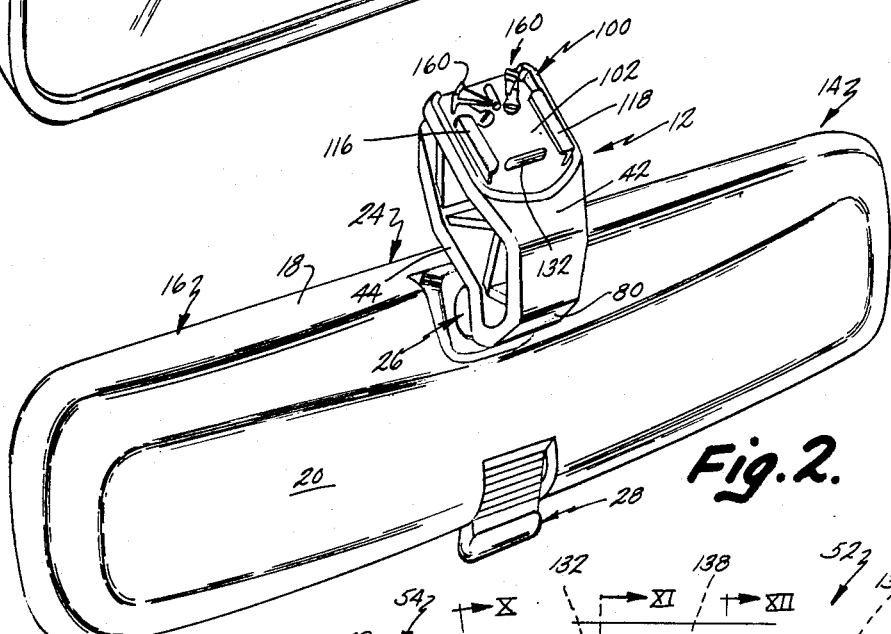
FIG. 2 is a perspective, rear elevational view of the bracket and mirror assembly.

A preferred embodiment of an interior rearview mirror assembly in accordance with the present invention is illustrated in FIGS. 1 and 2 and generally designated 10. Mirror assembly 10 includes a support bracket 12 and a mirror case assembly generally designated 14. Mirror case assembly 14 includes a case 16 having a surrounding flange 18 and a rear wall 20. Case 16 supports a reflective surface or mirror 22. In the embodiment illustrated, a toggle mechanism 24 is supported within the case. The toggle defines a socket 26 and includes an operating lever 28. The toggle assembly 24 is employed in day/night mirrors in which reflective surface 22 is a prism. Flipping or movement of the toggle actuator 28 pivots the mirror case with respect to the bracket 12 to provide day/night capability. A more detailed description of the mirror case assembly and toggle mechanism may be found in co-pending application Ser. No. 276,969 now U.S. Pat. No. 4,436,371, entitled VEHICLE MIRROR ASSEMBLY, filed on even date herewith. Other mirror case assemblies, with or without a day/night feature, may be employed with bracket 12.

Figure 3:
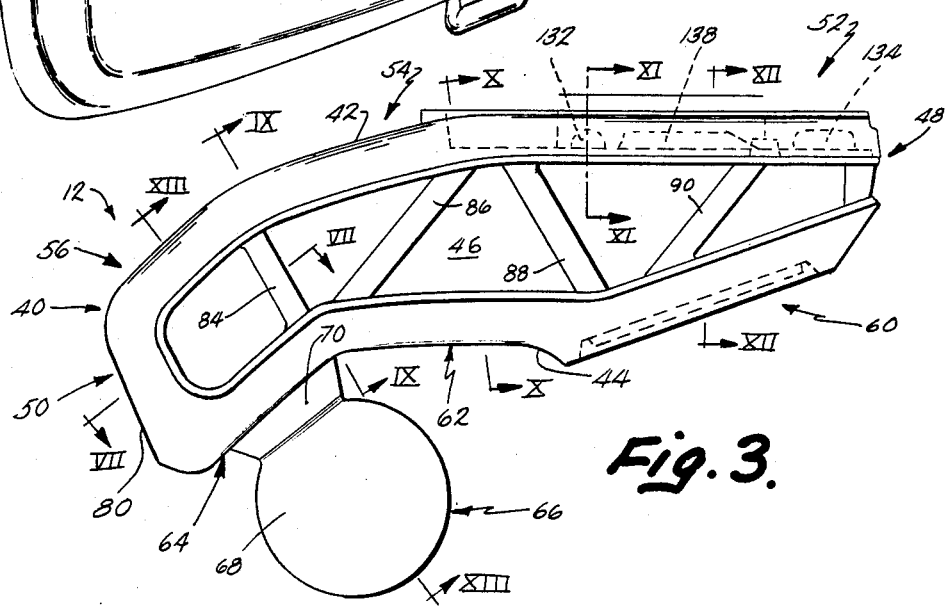
FIG. 3 is a side, elevational view of a one-piece bracket in accordance with the present invention.
Figure 4:
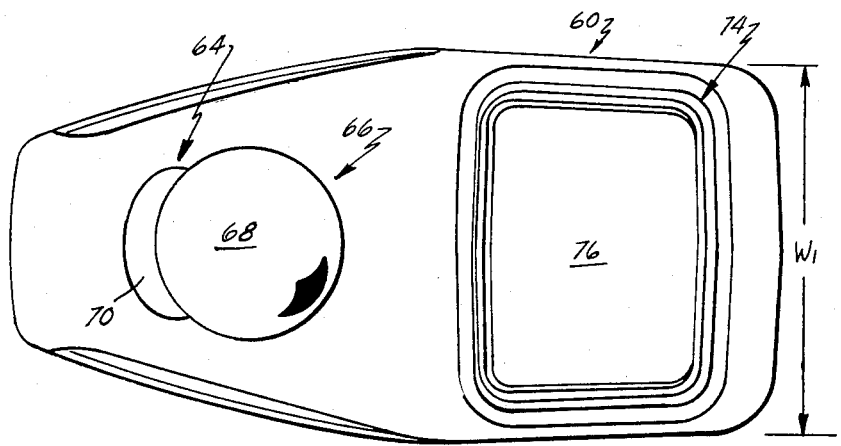
FIG. 4 is a front, plan view of the bracket.

Bracket 12 includes a main body portion 40. Main body 40 includes a rear flange 42, a front flange 44 and a central web 46. The body has a top end 48 and a bottom end 50. As best seen in FIG. 3, bracket 12 is configured to comply with the geometric design requirements imposed upon the mirror assembly by the angle of inclination of vehicle windshields and by the radii of curvature of such windshields. Rear flange 42 includes a first, generally planar portion 52, a second portion 54 which is angled with respect to the first portion and a third portion 56. Portion 56 is angled with respect to portion 54. Portion 52 is generally planar or flat and defines a bracket attachment means which is described in detail below.

Figure 5:
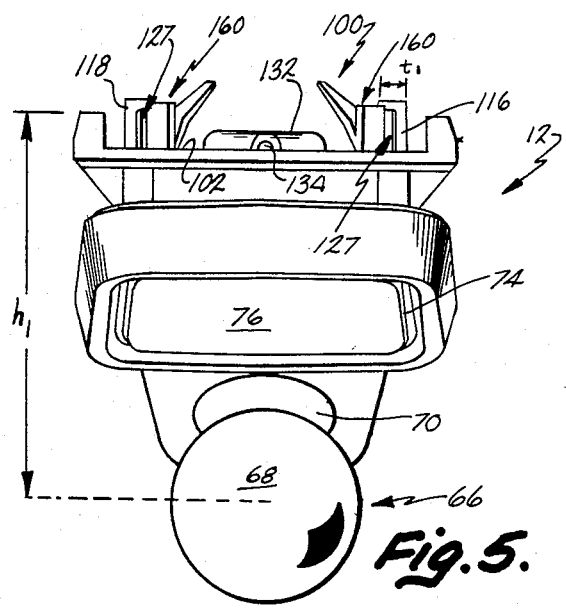
FIG. 5 is a top end, elevational view of the bracket.

Flange 44 defines three portions including a first, planar portion 60, an intermediate portion 62 and a lower portion 64. Extending outwardly from portion 64 and formed integral therewith is a mirror case mounting means 66. Means 66 includes a spherical ball 68 formed integral with a neck 70. Neck 70 is joined centrally of flange portion 64 (FIG. 5). As seen in FIGS. 1, 3, 4 and 13, portion 60 of the front flange 44 includes an annular recess or groove 74 which defines a planar surface 76. Surface 76 is a styling/logo area. The bracket may be "customized" to the particular vehicle manufacture and/or special styling, logos or other trim may be added to area 76 of the bracket.

Figure 7:
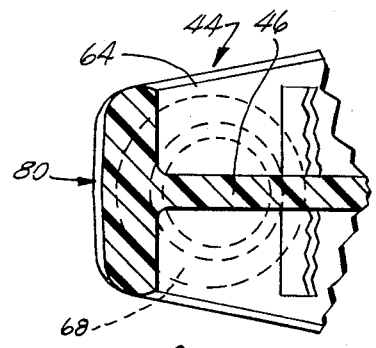
FIG. 7 is a fragmentary, cross-sectional view taken generally along line VII—VII of FIG. 3.
Figure 8:
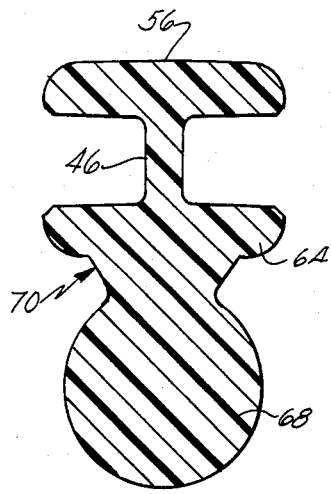
FIG. 8 is a cross-sectional view taken generally along line VIII—VIII of FIG. 3.

As seen in FIGS. 2, 3 and 7, flanges 42, 44 at the bottom end 50 of the bracket merge in a lower end flange 80. The flanges extend outwardly symmetrically about the planar web 46 of the main body. As seen in FIG. 8, neck 70 is integral with portion 64 of the front flange. The flanges taper inwardly from the top end of the body downwardly towards the bottom end, at which point the mirror attachment or mounting means 66 is positioned.

Figure 9:
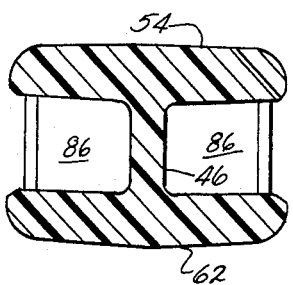
FIG. 9 is a cross-sectional veiw taken generally along line IX—IX of FIG. 3.
Figure 10:
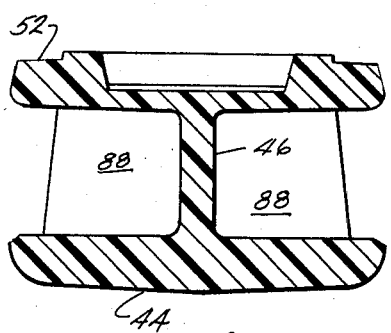
FIG. 10 is a cross-sectional view taken generally along line X—X of FIG. 3.

The I-beam configuration of the body (FIGS. 8 and 9 and 10) provides sufficient strength to the bracket and rigidity while decreasing the material needed to achieve such strength and rigidity. The I-beam configuration in cross section provides suitable vibration characteristics to the mirror. The mirror must be supported within the vehicle in a stable, essentially vibration-free fashion.

It is preferred that the complete mirror and bracket assembly when mounted on a windshield button have minimal image distortion due to vibration caused by road shocks to the vehicle and the like. The vibration characteristics of the bracket, in the embodiment illustrated in FIGS. 1—2, are improved by the inclusion of a plurality of angularly related ribs 84, 86, 88 and 90. The ribs are integral with and extend outwardly from central web 46 and between the inner surfaces of rear flange 42 and front flange 44. The ribs extend from both sides of the central web and the same numerical designations have been employed for the ribs on each side of the web. Rib 84 extends perpendicular to the flanges adjacent the mounting ball 68. Ribs 86, 88 are angularly related with respect to each other and are tapered inwardly with respect to each other from the front flange 44 to the rear flange 42. The ribs insure that the bracket has the rigidity required to meet the various governmental regulations and testing procedures. The material requirements for the bracket are reduced by employing the I-beam configuration and angularly related ribs.

The bracket attachment means defined by portion 52 of rear flange 42 is adapted to receive a button which is mounted to the windshield of a vehicle. Typical buttons have a generally trapezoidal configuration and longitudinally extending, inwardly directed sides. The button is secured to the windshield by a suitable adhesive in a conventional and known fashion.

Figure 6:
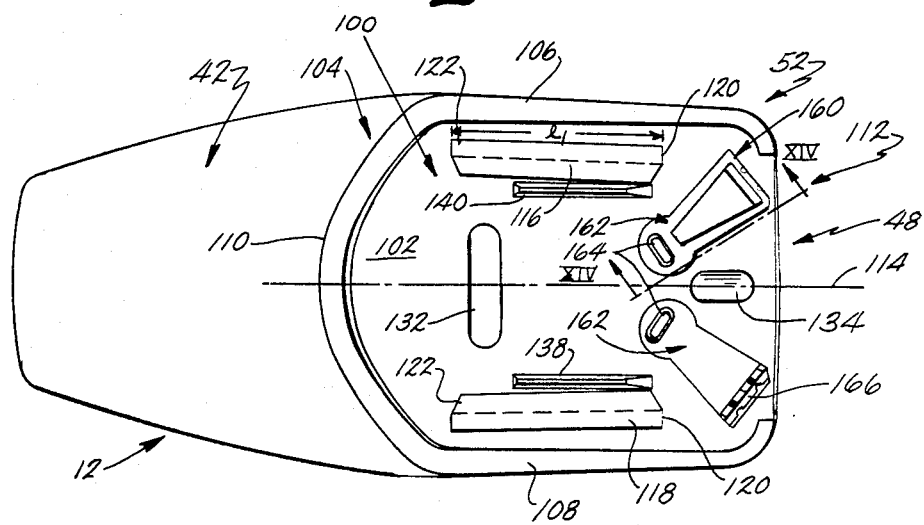
FIG. 6 is a rear, plan view of the bracket.

Portion 52 of the bracket, as seen in FIGS. 2, 5 and 6, defines a recessed area 100 having a planar floor, area or surface 102. Area 102 is surrounded on three sides by a wall 104. Wall 104 includes sides 106, 108 and a base or bottom wall 10 (FIG. 6). Surrounding wall 104 is open at its upper end 112 for receipt of the mounting button, as described below.

Positioned symmetrically about a longitudinal centerline 114 (FIG. 6) of floor 102 are opposed clips 116, 118. Clips 116, 118 are spaced apart closer adjacent their forward ends 120 than adjacent their rearward ends 122. The clips have a configuration which is the negative of the side taper of the button which is attached to the windshield.

Figure 12:
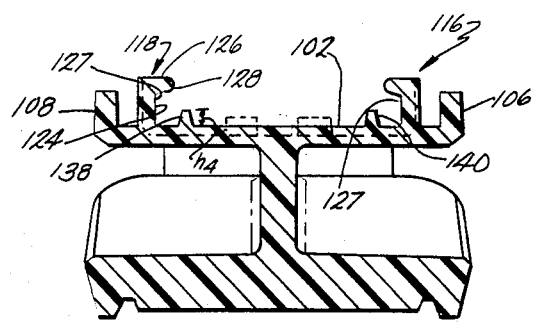
FIG. 12 is a cross-sectional view taken generally along line XII—XII of FIG. 3.
Figure 13:
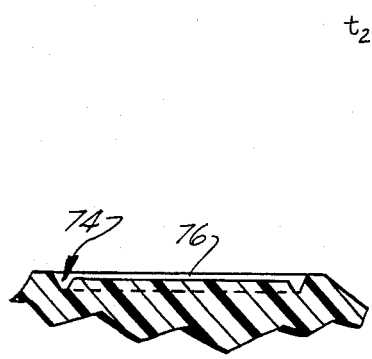
FIG. 13 is a fragmentary, cross-sectional view taken generally along line XIII—XIII of FIG. 1.

As seen in FIG. 12, each clip 116, 118 is generally channel-shaped in cross section and includes an upstanding sidewall 124 and an inwardly directed lip 126. The clips define opposed, inwardly facing grooves 127 (FIGS. 5 and 12). A lower or under surface 128 of each lip 126 is angled downwardly towards floor 102. The clips clamp the bracket to the windshield button.

The clips are configured and formed from a suitable resilient material to prevent vibration of the mirror yet withstand all reasonable loads expected to be encountered in normal use. The clips also permit removal or breakaway action of the bracket from the button when the bracket is impacted with a predetermined load. The slope of the undersurface 128, which is a presently existing embodiment is 15° downwardly from horizontal, facilitates ejection or separation of the bracket from the button.

Figure 11:
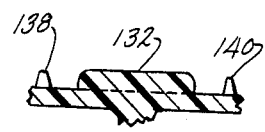
FIG. 11 is a fragmentary, cross-sectional view taken generally along line XI—XI of FIG. 3.

As seen in FIG. 3, 6 and 11, a pivot and tension support member 132 extends transversely and symmetrically about centerline 114 between the surrounding walls 106, 108. Member 132 is positioned adjacent the lower ends 122 of clips 116, 118. Support member 132 has an oblong half cylindrical configuration.

Adjacent the upper end of floor 102 is a tension support member 134 (FIGS. 3 and 6). Tension support member 134 also has an oblong, half-cylindrical configuration. Member 134, however, extends longitudinally along centerline 114. Member 134 is at right angles to the pivot and tension support member 132. Member 132, as explained below, applies a tension clip 116, 118 when the button is slid into opposed grooves 127 defined by the clips. In the event that the mirror sustains an impact, member 132 acts as a pivot about which the bracket rotates causing the bracket and mirror assembly to break away from the mounting button. The tension support 134 engages the support button applying a tension to the clips. Members 132, 134, therefore, secure the bracket to the button. The main body configuration and the location of the attachment means prevent so-called "column loading" of the assembly. A moment arm will always exist between an impact force and the pivot point defined by member 132.

As seen in FIGS. 6 and 12, bracket attachment means 52 includes a pair of longitudinally extending, elongated, opposed V-shaped guides or bars 138, 140. The V-shpaed guides are transversely spaced from one another and extend upwardly from the planar floor area 102. Each V-shaped guide is adjacent one of the clips 116, 118. The guides prevent the leading or loading edge of the button from "catching" on the floor 102 of the bracket attachment means. These members extend upwardly from the floor and facilitate assembly of the bracket onto the button.

The embodiment illustrated in FIGS. 1-6 is adapted for loading onto the button from the bottom edge of the button. This permits the bracket to be used in vehicles where the windshield button must be positioned relatively close to the vehicle header. Such positioning would make loading from above difficult. The surrounding wall 104, and particularly its bottom or back wall portion 110, limits the upward movement of the bracket and attachment means onto the button.

Figure 14:
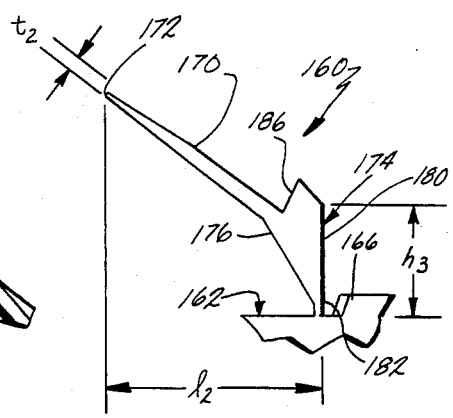
FIG. 14 is a side, elevational view of a resilient, leg or retaining means incorporated in the embodiment of FIGS. 1 and 2.
Figure 15:
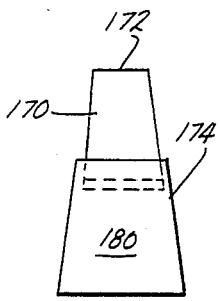
FIG. 15 is a rear, elevational view of the leg of FIG. 14.

Provision is made to insure that the bracket will not slide downwardly from the button after installation. As seen in FIGS. 2, 5 and 6, the attachment means includes a pair of resilient leg elements 160. Leg elements 160 are disposed within complementary configured recesses 162 defined by the floor 102. Each recess is angled inwardly towards the longitudinal centerline 114 of floor area 102. Upstanding studs 164 are formed at the lower ends of the recesses. At the rear ends, the recesses are provided with stops 166 (FIG. 6). As best seen in FIGS. 14 and 15, each leg 160 includes an elongated portion 170 having a free end 172 and a base portion 174. Base portion 174 includes inwardly tapered front and back faces 176, 178, respectively. Faces 176, 180 taper inwardly to a narrow portion 182 which is integral with and joins leg 160 to the back flange. Portion 182 acts as a "living hinge" permitting the legs to rotate downwardly during assembly, as explained below. Since the legs are formed from a resilient material, they are inherently biased to an upstanding position, as illustrated in FIGS. 5 and 14.

Elongated portion 170 and base 174 are joined together to define a stop shoulder 186. The stop shoulder, as explained below, engages an upper or trailing end of the button. The legs function as a resilient retaining means to insure that the bracket is retained on the button after assembly.

ASSEMBLY AND OPERATION

Figure 16:
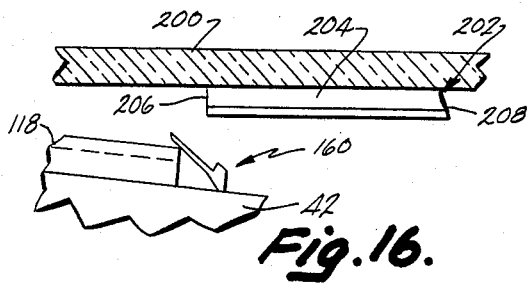
FIGS. 16–18 are fragmentary, side elevational views showing the manner by which the bracket is installed onto a windshield mounted button.
Figure 17:
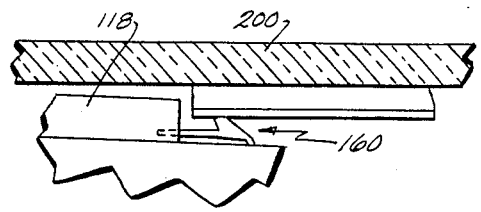
Figure 18:
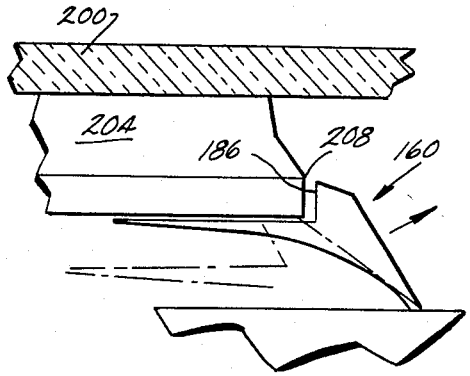
Figure 19:
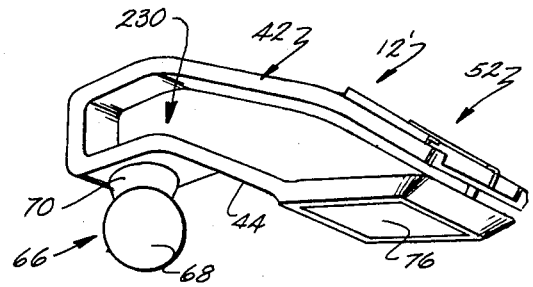
FIG. 19 is a perspective view of an alternative bracket in accordance with the present invention.

The assembly of the bracket in accordance with the present invention to a windshield button is illustrated in FIGS. 16, 17 and 18. As shown there, a vehicle windshield 200 has secured thereto a mounting button 202. Button 202 is secured to the windshield in a conventional fashion, such as by suitable adhesives. The button 202 is a relatively rigid member and is of a configuration found on present Ford Motor Company passenger cars. The button may be fabricated from die cast metals or other materials having a coefficient of thermal expansion substantially the same as that of the windshield 200. Button 202 includes inwardly tapered, laterally extending sides 204. End 206 of the button is facing towards the dash of the vehicle and end 208 is facing towards the vehicle header. End 206 is wider than end 208.

To assemble the bracket onto the button, the bracket is initially positioned below the button 202 and the leading edge 206 of the button is located at the entry end to the clips 118, 116 (FIG. 16). The bracket is then pushed upwardly towards the vehicle header. The button will depress or pivot the legs 160 downwardly towards floor area 102. The legs will pivot until free ends 172 of portions 170 engage upstanding studs 164 in recesses 162. The wide end 206 of the button will force clips 116, 118 outwardly initially since this end enters the clips at their narrowest width. This initial strain on the clips is eliminated after assembly is completed.

As the bracket is pushed in V-guides 138 engage button 204 and prevent interference between the button and the floor of the attachment means. Contact is made between the button and resilient support elements 132, 134. The bracket is pushed upwardly until the button is engaged by portion 110 of surrounding wall 104. The bracket is now in the position shown in FIG. 18. In this position, the legs 160 have sufficient clearance to rotate in a clockwise direction, as seen in FIG. 18, to clear the top end 208 of the button 202. The stop shoulders 186 of the legs prevent the bracket from shifting downwardly and off the button after assembly. If the bracket is pulled downwardly with an excessive force, the legs 160 may break at their bases of hinge portions 182. The legs would detach and move against stops 166 in recessed areas 162. The legs would be "trapped" between the stops 166 and the button 202 to prevent complete removal without depression of the legs as occured during installation.

As seen in FIGS. 12, 16-18 and 24 the bracket attachment means are positioned on rear flange 42 to engage the windshield button 202 and suspend the bracket such that planar portion 52 of rear flange 42 extends generally parallel to the windshield mounted button at the area of attachment. In addition, the central web 46 of the bracket extends generally perpendicular to the planar portion 52 of rear flange 42 at that attachment area and to the windshield-mounted button as well. Accordingly, the I-beam configuration of the support bracket, when oriented in the above manner, provides strength and stability for supporting a mirror case.

If the mirror case receives an impact of a predetermined magnitude, the bracket will separate or break away from the mounting button 202. Since the spherical ball 68 is positioned at an angle with and below the attachment means, a moment arm exists between the ball and pivot and support member 132. With the force being applied to the ball, member 132 acts as a pivot and the bracket rotates about this member. The resilient clips 116, 118 spread apart until they separate from button 202. The bracket will therefore "break away" from the support button without breakage of the bracket main body.

It is presently preferred that the bracket be injection molded as a one-piece unit from a suitable acetal copolymer material. One such material is that sold under the brand name Celcon M-90 by Celanese Corporation. This material has a yield stress of 61 N/mm² and an elongation of 60% in accordance with ASTM Test Method D 638 Speed "B" and a flexural modulus of 2590 N/mm² and flexural stress at 5° deflection of 90 N/mm² in accordance with ASTM Test Method D 790. The notched impact (120 D) property in accordance with ASTM Test Method D 256 for this material is 1360 N mm/mm.

In the alternative, the bracket could be molded in two parts which are subsequently bonded together, or it could be made in a two-stage molding process so that separate materials could be employed. For example, a glass-filled material could be employed for the main bracket body in order to obtain suitable vibration properties and an engineering thermoplastic could be employed for the attachment means of the bracket.

In a presently existing embodiment of the bracket in accordance with the present invention, the main body has an overall width $w_1$ (FIG. 4) of approximately 35 mm, an overall height $h_1$ (FIG. 5) to the center of the ball 68 of approximately 34.6 mm. Each clip 116, 118 has a length 11 (FIG. 6) of approximately 19 mm. Lip 126 of each clip 116, 118 has a transverse dimension $t_1$ (FIG. 5) of approximately 3 mm. The maximum thickness of the lip and the vertical sidewall 124 of the clip is approximately 1.45 mm. Each leg 160 has an overall length $l_2$ (FIG. 14) of approximately 7.44 mm. Portion 170 has a minimum thickness $t_2$ (FIG. 14) of approximately 0.24 mm. The leading portion of leg 160 is tapered at an angle of approximately 5°. The overall height $h_3$ (FIG. 14) of base 174 of each leg 160 is approximately 3.40 mm. Each of the V-guides 138, 140 has an overall height $h_4$ (FIG. 12) of 1.55 mm and an included angle of approximately 30°. Pivot and tension support member 132 has an overall length of 8 mm.

The basic dimensioning of the bracket main body and its angular configuration is determined by the geometric design constraints of existing windshields. The bracket is designed for "universal" application in vehicles of U.S. manufacture. Automobiles of U.S. manufacture have a windshield angle of inclination within the range of 31°–38°, a radius of curvature within the range of 5,000–7,000 mm and a vertical height from the base of the mirror glass at a nominal driving position to the base of the header of approximately 105–122 mm. Employing the "means" of these values, the basic bracket configuration or dimensioning thereof can be determined. The bracket is symmetrical about a nominal centerline extending down the center of the central flange 46 and is also symmetrical about a longitudinal centerline 114 extending down and through the center of the flanges 42, 44. The bracket is capable of relatively high volume manufacture at reduced costs when compared to the multi-piece brackets heretofore employed. The bracket is configured to the various windshield angles of inclination which can be encountered and readily provides a "breakaway" feature due to the resilient clips and tension and support pivot member. The bracket may be assembled from below the button and is therefore usable in vehicles wherein the button must be located close to the vehicle header.

BRACKET ALTERNATIVE EMBODIMENT

Figure 20:
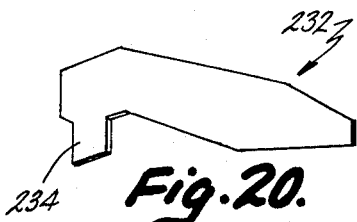
FIG. 20 is a perspective view of a rigid stiffening insert included in the embodiment of FIG. 19.
Figure 21:
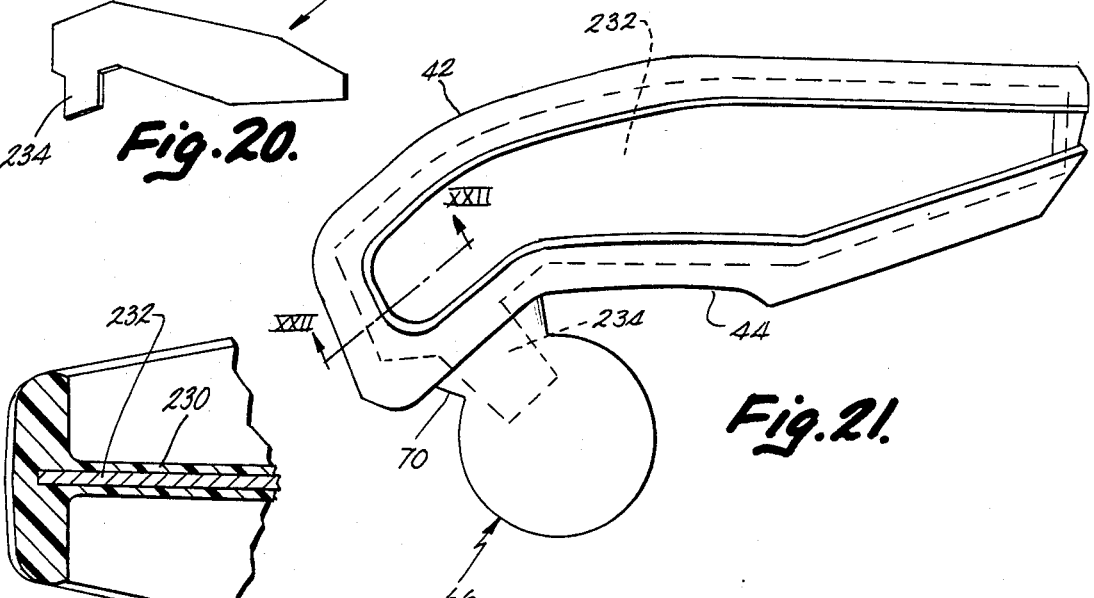
FIG. 21 is a side, elevational view of the alternative embodiment of FIG. 19.
Figure 22:
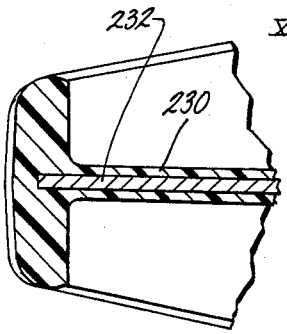
FIG. 22 is a fragmentary, cross-sectional view taken generally along line XXII—XXII of FIG. 21.

An alternative embodiment of the bracket is illustrated in FIGS. 19-22 and generally designated 12'. Bracket 12' differs from bracket 12 primarily in the elimination of the reinforcing ribs 84, 86, 88 and 90. Bracket 12' similarly includes a rear flange 42 and a front flange 44. Extending from and formed integral with front flange 44 is a mirror case mounting means 66 including the spherical ball 68 and neck 70. Front flange 44 includes a styling/logo area 76. Also, the bracket attachment means 52, as in the previous embodiment, is defined on the upper end of rear flange 42. The bracket 12' includes a central web 230. Therefore, bracket 12' has an I-beam configuration in cross section. Rigidity is provided by a metal, planar insert 232 (FIG. 20). As shown, the insert 232 has a configuration which corresponds generally to the side elevation of the bracket body 12'. As seen in FIGS. 21 and 22, rigid metal insert 232 is disposed centrally within the central web 230. Insert 232 has a depending leg portion 234 which extends into the neck area 70 of mirror attachment 66. Bracket 12' is fabricatd from the same preferred materials as bracket 12. The desired rigidity and vibration characteristics are obtained by molding the main body about the metal reinforcement insert 232.

ALTERNATIVE BRACKET ATTACHMENT MEANS

Figure 23:
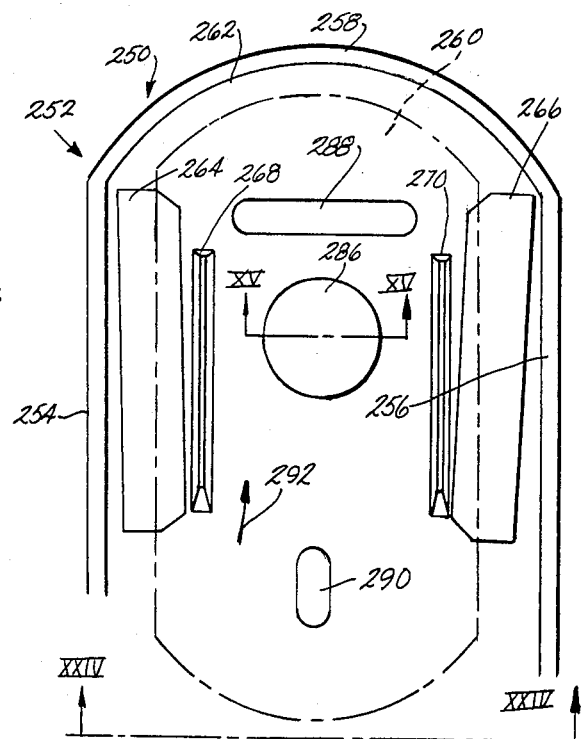
FIG. 23 is a rear, elevational veiw of an alternative attachment means in accordance with the present invention.
Figure 24:
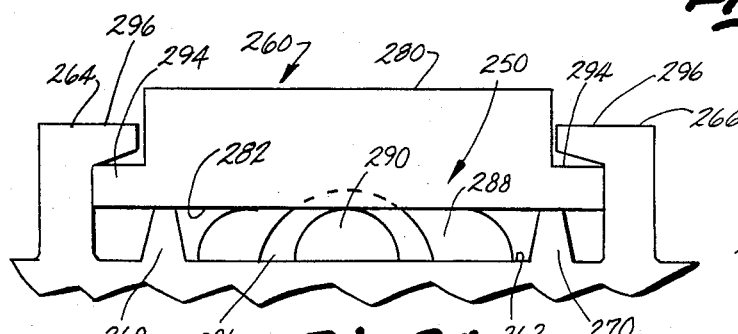
FIG. 24 is a fragmentary, end elevational view taken generally along line XXIV—XXIV of FIG. 23.
Figure 25:
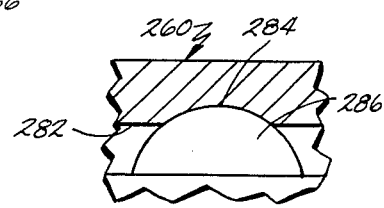
FIG. 25 is a cross-sectional view taken generally along line XXV—XXV of FIG. 23.

An alternative bracket attachment means for use with either of the bracket main bodies is illustrated in FIGS. 23, 24 and 25. Attachment means 250 is formed integral with or joined to a back flange or other rear surface of the bracket main body. As illustrated, the attachment means includes a surrounding wall 252 having lateral sidewalls 255, 256 and a top end wall 258. Attachment means 250 is adapted to be slid onto a button shown in phantom in FIG. 23 and designated 260. Attachment 250 defines a planar member or floor surface 262. Positioned in opposed, spaced relationship are clips 264, 266. Clips 264, 266 are identical in configuration to clips 116, 118 of the embodiment illustrated in FIG. 6. Embodiment 250 includes elongated V-shaped in cross section, guides 268, 270. Guides 268, 270, as in the prior embodiment, extend immediately in front of the opposed grooves defined by the clips 264, 266.

Attachment means 250 is adapted for use with a button 260 which, as seen in FIG. 24, includes a rear surface 280 which is attached to the windshield. Button 260 includes a front surface 282. As shown in FIG. 25, front surface 282 defines a spherical-shaped recess 284 which opens therethrough. Recess 284 cooperates with a semispherical, resilient member 286 which extends from floor 262 of the attachment means. Member 286 is positioned between clips 264, 266.

Attachment means 250 inlcudes a transversely extending tension member 288 and a longitudinally extending, perpendicularly related tension member 290. Tension members 288, 290 are oblong, half-cylindrical shaped members.

As seen in FIGS. 23 and 24, when the button is inserted in the direction of arrow 292, front face 282 will be engaged by the V-guides 268, 270 and by tension and support members 288, 290. The outwardly extending flanges 294 of the button will be biased into engagement with the undersurface of the lips 296 of the clips 264, 266.

Members 288, 290 and the V-guides place the clips in tension so that the bracket is securely retained on the button. Semispherical member 286 functions as a retaining means and is received within the recess 284. Member 286 insures that the bracket is retained on the button in a detent fashion. Semispherical member 286 replaces the resilient legs 160 of the previous embodiment.

Attachment 250 includes the same breakaway feature as the prior embodiment. When subjected to a load at a mirror case mounting means, the bracket will pivot or rotate about the pivot member 288 and the clips 264, 266 will release from the button 260.

Figure 26:
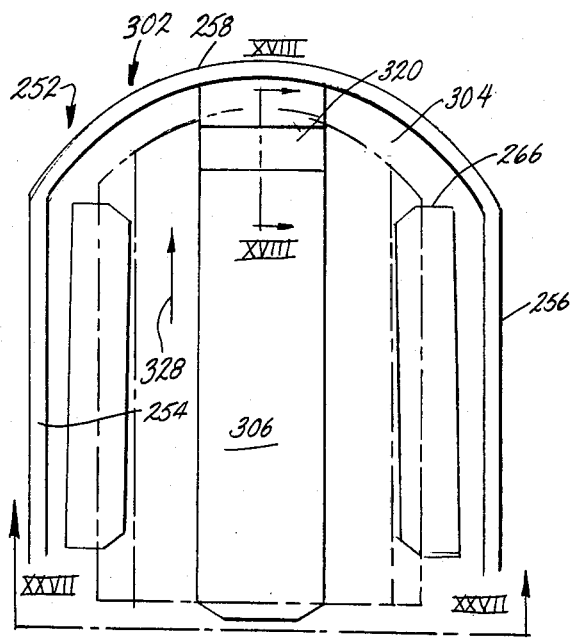
FIG. 26 is a rear, plan elevational view of a further alternative embodiment of an attachment means in accordance with the present invention.
Figure 28:
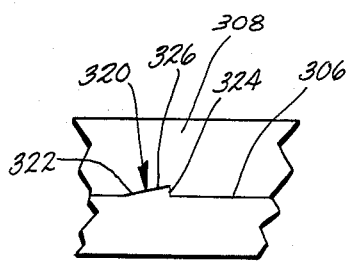
FIG. 28 is a cross-sectional view taken generally along line XXVIII—XXVIII of FIG. 26.
Figure 27:
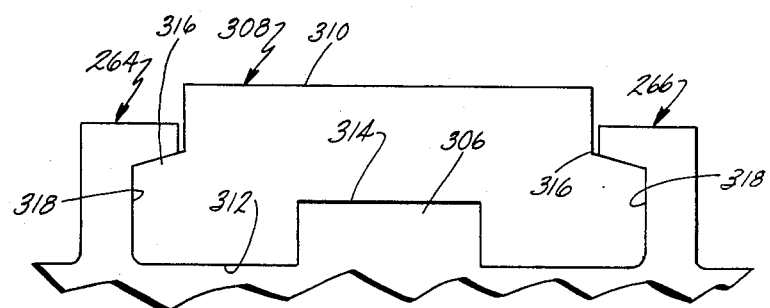
FIG. 27 is an end, elevational view taken generally along line XXVII—XXVII of FIG. 26.

FIGS. 26, 27 and 28 illustrate a still further alternative embodiment of an attachment means in accordance with the present invention. The alternative attachment means, designated 302 in FIG. 26, includes a surrounding wall 252 having lateral sides 254, 256 and a lower end wall 258. Opposed, inwardly facing clips 264, 266 extend outwardly from the floor or planar area 304. As seen in the end view (FIG. 27), floor 304 defines a generally rectangular configured, elongated guide 306.

Attachment means 302 is adapted for use with a button generally designated 308. Button 308 includes a rear surface 310 which is secured to the windshield and a front surface 312. Front surface 312 defines an elongated, rectangular in cross section, recess 314 which is configured to receive elongated guide 306 defined by the attachment means. Button 308 also includes dovetail-shaped side flanges 316 which are received in opposed grooves 318 by clips 264, 266.

Bracket attachment means 302 is retained on the button by a transversely extending, sloped ridge 320. As seen in FIG. 26, ridge 320 extends transversely of the center, longitudinally extending guide 306. Ridge 320 includes a top surface 322 and a front or stop surface 324. Button 308 is formed with a correspondingly or matingly configured recess 326.

When attachment means 302 is slid onto button 308, in the direction of arrow 328 (FIG. 26), recess 314 receives guide 306 and ridge 320 snaps into recess 326 in a detent fashion. Ridge 320, which is resilient, retains the bracket on the mounting button.

Embodiment 302 releases from the button in the same fashion as in the prior embodiments. When the bracket is impacted, it will pivot about detent ridge 230. Clips 264, 266 will expand and release from flanges 316 of button 308. Guide 306 is dimensioned to tension clips 264, 266 so that they are placed under an initial strain. This insures that the bracket will be securely held by the button and that suitable vibration characteristics will be obtained.

In view of the foregoing description, those of ordinary skill in the art will undoubtedly envision various modifications which will not depart from the inventive concepts disclosed herein. For example, the mirror case mounting means which is illustrated in the form of a spherical ball could be eliminated. A socket could be formed as part of or added to the front flange of the body and the ball defined by the mirror case assembly. The specific attachment means which have been illustrated could be employed with a main body other than the I-beam configuration expressly illustrated.

The unique mirror support bracket in accordance with the present invention provides the manufacture with a bracket which is "universely" adaptable to the various vehicle windshield angles and curvatures. The bracket provides a unique breakaway feature yet insures that it is stably held without annoying vibrations. The resilient clips and tension and support members incorporated in each of the attachment means accomplish this result. Further, the bracket is readily secured to the button from below. This eliminates problems caused by insufficient clearance between the button and the vehicle header. The bracket may be relatively inexpensively manufactured as a single, one-piece injection molded member. This eliminates the multiple parts heretofore employed in interior rearview mirror assemblies. The assembly is, however, aesthetically pleasing and additional covering caps need not be employed.

It is expressly intended, therefore, that the above description should be considered as that of the preferred embodiment. The true spirit and scope of the present invention may be determined by reference to the appended claims.

The embodiments of the invention in which an exclusive property or privilege is claimed are defined as follows.

1. A breakaway rearview mirror bracket for attaching a rearview mirror to a mounting button, said bracket comprising:
   a body having a top end and a bottom end, said body further including mirror case mounting means at its bottom end for adjustably mounting a mirror case to said body; and
   an attachment means joined to said body adjacent said top end, said attachment means comprising:
   a generally planar member;
   a pair of opposed, elongated clips which define opposed, inwardly opening grooves dimensioned to receive the mounting button in a tongue and groove fashion, said clips being formed of a resilient material, each of said clips being generally L-shaped in cross section including a sidewall and an inwardly directed lip having an under surface which is sloped downwardly towards said sidewall;
   pivot and tension means mounted in a substantially fixed position on and extending from said planar member for engaging the mounting button, said pivot and tension means dimensioned to tension the clips after receipt of the button to securely locate the bracket on the button and to act as a substantially fixed pivot to cause the bracket to break away from the button when the bracket sustains a predetermined impact;
   a surrounding wall which encloses and extends around three sides of said planar member, said wall defining an open end for receipt of the button;
   resilient retaining means adjacent said clips for engaging and retaining said body on the button after said clips have received the button; and
   a pair of transversely spaced, longitudinally extending guides, each having a generally V-shaped in cross section, said guides extending upwardly from said planar member, one of said guides being adjacent each of said clips to prevent a leading edge of the button from catching on the attachment means as the clips are slid over the button.

2. A breakaway rearview mirror bracket for attaching a rearview mirror to a mounting button, said bracket comprising:
   a body having a top end and a bottom end, said body further including mirror case mounting means at its bottom end for adjustably mounting a mirror case to said body; and
   an attachment means joined to said body adjacent said top end, said attachment means comprising:
   a generally planar member;
   a pair of opposed, elongated clips which define opposed, inwardly opening grooves dimensioned to receive the mounting button in a tongue and groove fashion, said clips being formed of a resilient material, each of said clips being generally L-shaped in cross section including a sidewall and an inwardly directed lip having an under surface which is sloped downwardly towards said sidewall;
   pivot and tension means mounted in a substantially fixed position on and extending from said planar member for engaging the mounting button, said pivot and tension means dimensioned to tension the clips after receipt of the button to securely locate the bracket on the button and to act as a substantially fixed pivot to cause the bracket to break away from the button when the bracket sustains a predetermined impact;

a surrounding wall which encloses and extends around three sides of said planar member, said wall defining an open end for receipt of the button, said wall opening toward the bottom end of said body;

resilient retaining means adjacent said clips for engaging and retaining said body on the button after said clips have received the button, said resilient retaining means including an integral semi-spherical member attached in a substantially fixed position to and extending from said planar member which engages the button and tensions the clips; and a pair of transversely spaced, longitudinally extending guides, each having a generally V-shape in cross section, said guides extending upwardly from said planar member, one of said guides being adjacent each of said clips to prevent a leading edge of the button from catching on the attachment means as the clips are slid over the button.

* * * * *

UNITED STATES PATENT AND TRADEMARK OFFICE
CERTIFICATE OF CORRECTION

PATENT NO. : 4,524,941

DATED : June 25, 1985

INVENTOR(S) : Denis Wood et al.

It is certified that error appears in the above-identified patent and that said Letters Patent is hereby corrected as shown below:

Column 1, line 9:

After "276,838" insert --now U.S. Patent No. 4,435,042--

Column 1, line 55:

Before "view" insert --field of--

Column 2, lines 33 and 34:

"corresponding" should be --correspondingly--

Column 3, line 12:

"radii or" should be --radii of--

Column 3, line 27:

"attachement" should be --attachment--

Column 4, line 46:

"veiw" should be --view--

Column 5, line 64:

"Figs. 1-2" should be --Figs. 1-12--

UNITED STATES PATENT AND TRADEMARK OFFICE
CERTIFICATE OF CORRECTION

PATENT NO. : 4,524,941

DATED : June 25, 1985

INVENTOR(S) : Denis Wood et al.

It is certified that error appears in the above-identified patent and that said Letters Patent is hereby corrected as shown below:

Column 6, line 23:

"10" should be --110--

Column 6, line 46:

"which is" should be --which in--

Column 6, line 50:

"Fig." should be --Figs.--

Column 6, line 62:

After "tension" insert --to--

Column 7, line 10:

"V-shpaed" should be --V-shaped--

Column 7, line 58:

"there" should be --therein--

Column 10, line 10:

"fabricatd" should be --fabricated--

UNITED STATES PATENT AND TRADEMARK OFFICE
CERTIFICATE OF CORRECTION

PATENT NO. : 4,524,941

DATED : June 25, 1985

INVENTOR(S) : Denis Wood et al.

It is certified that error appears in the above-identified patent and that said Letters Patent is hereby corrected as shown below:

Column 10, line 43:

"inlcudes" should be --includes--

Column 11, line 17:

After "Bracket" insert --or--

Signed and Sealed this

Seventeenth Day of December 1985

[SEAL]

Attest:

DONALD J. QUIGG

Attesting Officer

*Commissioner of Patents and Trademarks*